United States Patent [19]
Scrimpshire et al.

[11] Patent Number: 5,886,294
[45] Date of Patent: *Mar. 23, 1999

[54] INTERFERENCE SUPPRESSING CABLE BOOT ASSEMBLY

[76] Inventors: James Michael Scrimpshire, 3229 Rosemary Ave., Jackson, Miss. 39212; Rudolph D. Sullivan, Jr., 117 Pine La., Brandon, Miss. 39042

[ * ] Notice: The term of this patent shall not extend beyond the expiration date of Pat. No. 5,631,443.

[21] Appl. No.: 858,866

[22] Filed: May 19, 1997

Related U.S. Application Data

[63] Continuation-in-part of Ser. No. 453,754, May 30, 1995, Pat. No. 5,631,443.

[51] Int. Cl.$^6$ .................................................. H05K 9/00
[52] U.S. Cl. .................... 174/35 R; 174/35 C; 174/36
[58] Field of Search .................... 174/35 R, 35 C, 174/36, 84 R, 93

[56] References Cited

U.S. PATENT DOCUMENTS

| | | | |
|---|---|---|---|
| D. 294,486 | 3/1988 | Opitz | D13/24 |
| 3,089,915 | 5/1963 | Plummer | 174/36 |
| 3,750,084 | 7/1973 | Gardner | 439/277 |
| 4,173,385 | 11/1979 | Fenn et al. | 439/277 |
| 4,477,693 | 10/1984 | Krabec et al. | 174/36 |
| 4,540,230 | 9/1985 | Iversen et al. | 339/89 |
| 4,605,274 | 8/1986 | Ichikawa | 339/89 R |
| 4,647,714 | 3/1987 | Goto | 174/36 |
| 4,749,822 | 6/1988 | Klein | 174/36 |
| 4,837,409 | 6/1989 | Klosin | 174/84 R X |
| 4,869,679 | 9/1989 | Szegda | 439/277 |
| 5,023,401 | 6/1991 | Clifton | 174/87 |
| 5,083,943 | 1/1992 | Tarrant | 439/583 |
| 5,127,843 | 7/1992 | Henry et al. | 439/320 |
| 5,186,655 | 2/1993 | Glenday et al. | 439/583 |
| 5,281,651 | 1/1994 | Arjunan et al. | 524/519 |
| 5,539,148 | 7/1996 | Konishi et al. | 174/35 R |
| 5,631,443 | 5/1997 | Scrimpshire et al. | 174/35 R |

FOREIGN PATENT DOCUMENTS

| | | |
|---|---|---|
| 0 514 174 A1 | 11/1992 | European Pat. Off. . |
| 2 277 206 | 10/1994 | United Kingdom . |

*Primary Examiner*—Kristine Kincaid
*Assistant Examiner*—Chau N. Nguyen
*Attorney, Agent, or Firm*—Garvey, Smith, Nehrbass & Doody, LLC

[57] ABSTRACT

A flexible cable boot for external installation around a cable connector of the type being coaxial, triaxial, copper twisted pair, or fiber optic in nature. The cable boot would include a flexible, closely fit external sleeve having a compressive end for supporting a cable against excessive flexing and having on its second end an inwardly extending disc, deformable so that it can be screwed onto the external threads of a connector to form a seal, and including an internal shield to prevent EMI leakage radiation. The product would further includes a main body of thermoplastic rubber material which is ozone resistant. Contained within the body of the cable boot would be provided a metal based lining shielding bonded to the inner wall of the cable boot body with an adhesive material. The assembly is especially suitable for enclosing and protecting cable television coaxial connectors which would be mounted outside of a building such as on a pole or at a distribution splitter outside of a home.

13 Claims, 2 Drawing Sheets

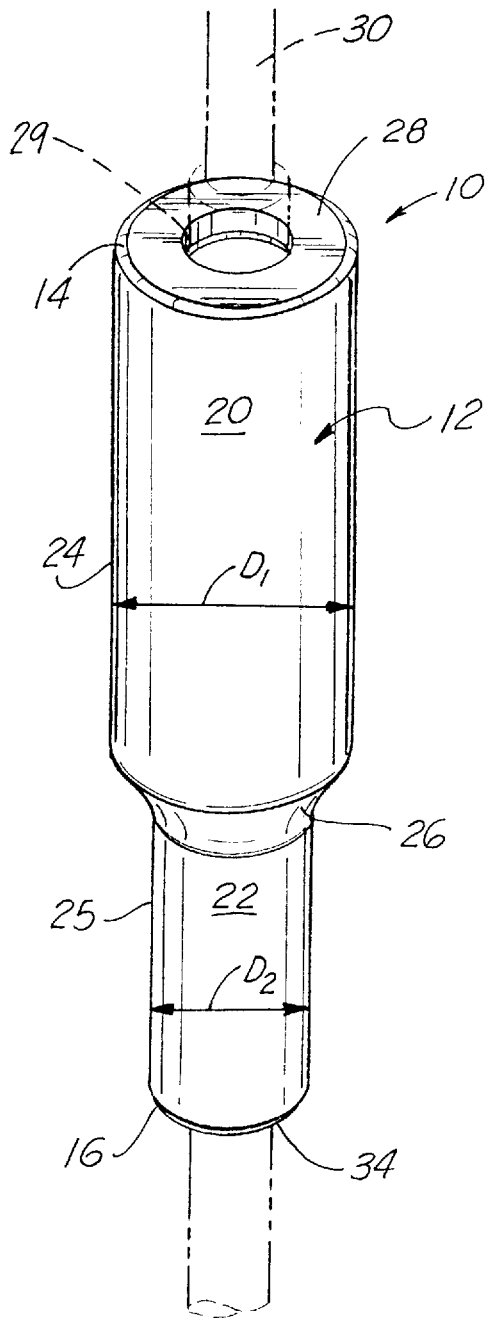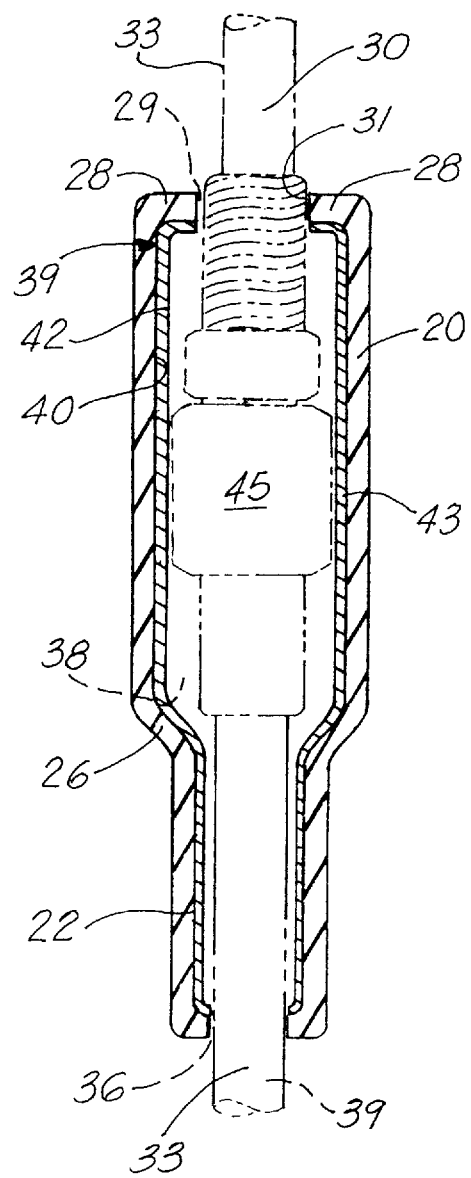

INTERFERENCE SUPPRESSING CABLE BOOT ASSEMBLY

CROSS-REFERENCE TO RELATED APPLICATIONS

This is a continuation-in-part application of U.S. patent application Ser. No. 08/453,754, filed May 30, 1995 now U.S. Pat. No. 5,631,443, by the same inventors, which is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to external sealing boots for enclosing and protecting various types of cable connections from environmental hazards and signal leakage.

2. General Background of the Invention

In the field of telecommunications systems, signal leakage is a very undesirable emission (egress) of radio frequency or digital signals from within cable/connector interfaces and equipment utilized to carry the signals within telecommunications systems. Within the shielded space of the cable/connector interface and equipment, is the area in which the electromagnetic waves occur. If the shielding which is afforded in such a system is not efficient, or fails to prevent leakage, then some portion of these signals can leak out into the atmosphere. If such leakage is sufficiently severs, it will have the ability to blank out radio receivers, interfere with aircraft navigation systems, and interfere with other communication reception such as television.

On the other hand, if signal leakage occurs and is able to egress from the cable/connector interface, such signals can also enter or ingress thereinto. Therefore, there is a potential for over-the-air frequencies to penetrate into the cable/connector interface through such ingress. The most common causes for ingress is at the cable/connector interface, which is normally due to poor installation from home owners and the telecommunication personnel such as installers or technicians, and may be due to environmental conditions which may cause connectors to work themselves loose and allow ingress and egress of such signals.

The Federal Communications Commission (FCC) requires, in most cases, a signal leakage control program. Such a program is undertaken by routine monitoring and cumulative leakage index (CLI). In most cases, the cable/connector interface is the source of the signal leakage. Due to the problems associated with interface, there is a major need to improve the RF and digital signals. There are several patents which have been found in the art, which address cable/connectors, to attempt to prevent water or other type of fluid flow into the connector. The most pertinent of the patents are as follows:

U.S. Pat. No. 4,173,385 issued to Fenn, et al. discloses a component of an overall claimed water-tight cable connector, a flexible boot having inner ribs along an extended end to seal to the outer sheath of a cable. The patent describes at the other end a lip engaging a flange on the collar of the connector to provide a water-tight seal.

Other patents disclose components that re integral to coaxial connectors.

U.S. Pat. No. 5,186,655 issued to Glenday, et al., discloses a connector in which the jacket of the coaxial cable is deformed to anchor and seal the connector.

U.S. Pat. No. 5,127,843, issued to Henry, et al., discloses as part of an integral connector, a connector having an insulated outer coupling shell covering an internal conductive shield or shell.

U.S. Pat. No. 4,540,230, issued to Iversen, et al., claims a connector which includes the use of O-rings or similar graphite seals and telescoping sleeves to provide for a sealed, insulated outer covering for the connector.

U.S. Pat. No. 4,605,274, issued to Ichikawa, discloses a connector having a hermetically sealed construction, and, further, having an internal construction within which the electrically connected elements which can move with respect to one another.

U.S. Pat. No. 4,869,679, issued to Szegda, discloses as part of a connector assembly, a stepped resilient sealing element clamped at one end to the connector and at the other end to the cable. See particularly FIG. 4, item 30 showing that the end of the sealing boot includes a circular lip which is received in an external circular recess in the cable sealing element.

U.S. Pat. No. 5,083,943, issued to Tarrant, discloses a CATV F connector in which a compressible gasket and a separator O-ring are claimed to provide continued shielding and weather-proofing of the connector.

U.S. Pat. No. 3,750,084, issued to Garner, discloses as part of an external cap or boot on a high-tension connector, internal threads on the boot. These internal threads engage external threads on the connector to provide for sealing. Note that the seal must not be complete as a resilient O-ring, as additionally required, and that the O-ring, not the boot, forms the actual fluid tight seal.

In spite of the art cited, there continues to be the need for a product which can enhance the lift of the cable/connector interface while together having certain mechanical and electrical benefits not found in the art.

BRIEF SUMMARY OF THE INVENTION

The improved assembly or apparatus of the present invention solves the problems in the art in a simple and straight forward manner. What is provided is an assembly for preventing electromagnetic interference and other exterior interference in cable connections which would include a generally flexible one-piece assembly body having first and second end portions, each of the end portions having an opening therethrough for accommodating a first cable connected to a connector, with the end portions forming a seal between the assembly body and the first cable and the connector. There is included a cavity within the assembly body for housing the connection between the first cable and the connector. There is further included a metal based lining positioned along an interior surface of the assembly body within the cavity for preventing ingress and egress of radiation from the connection between the first cable and the connector. Further, the assembly body includes external longitudinal reinforcement ribs for adding to the strength of the connector, and a plurality of concentric raised ribs at the first and second ends of the connector body for facilitating the placement of the connector onto the cable and the connector. Further, the improved assembly includes a plurality of sealing rings on the interior wall of the first and second end portions of the connector so that as the connector is slid into the connector body, the sealing rings at the first end of the connector form a seal between the rings provided in the connector and the wall of the cable, and on the second end the rings provide a seal between the connector body and the internal wall of the assembly. The sealing rings also prevent environmental hazards such as rain, dirt, and other foreign material from entering the interior of the connector body as it is in place.

The assembly body would further comprise a main body of rubber-like material, more preferably thermoplastic rubber material which is ozone resistant. Contained within the body of the cable boot would be provided a metallic shielding, preferably a foil/film/foil shielding tape of aluminum polypropylene aluminum bonded to the inner wall of the cable boot body with an adhesive material. The assembly is especially suitable for enclosing and protecting cable television coaxial connectors which would be mounted outside of a building, such as on a pole or at a distribution splitter inside or outside of a home.

Therefore, it is the principal object of the present invention to provide a flexible cable boot assembly which provides environmental protection against temperature, wind, salt, ice, moisture, corrosion or the like;

It is a further principal object of the present invention to provide a flexible cable boot assembly which helps to prevent connectors from becoming disconnected from one another;

It is a further principal object of the present invention to provide a flexible cable boot assembly which would be utilized for protecting and shielding an inline splice, against temperature, wind, salt, ice, moisture, corrosion or the like;

It is the further object of the present invention to provide a flexible cable boot, which maybe utilized on splices on splitters, taps and ground blocks, for each connector or cable interface found therein.

It is a further object of the present invention to provide a flexible cable boot which in addition to protecting against environmental concerns, has the ability to shield against EMI leakage radiation and to prevent ingress or egress of radio signals from within the confines of any coaxial, triaxial, copper twisted pair of fiber optic cables or into the cable coupling assembly.

It is a further principal object of the present invention to provide an improved connector assembly which enables the assembly to engage around a cable and a connector and to form a seal between the cable and connector wall and the interior of the assembly through flexible concentric sealing rings at each end portion of the connector assembly.

BRIEF DESCRIPTION OF THE SEVERAL VIEW OF THE DRAWINGS

For a further understanding of the nature, objects, and advantages of the present invention, reference should be had to the following detailed description, read in conjunction with the following drawings, wherein like reference numerals denote like elements and wherein:

FIG. 1 an overall perspective view of the preferred embodiment of the apparatus of the present invention;

FIG. 2 is an overall cross-sectional view of the preferred embodiment of the apparatus of e present invention;

DETAILED DESCRIPTION OF THE INVENTION

Figure 3:
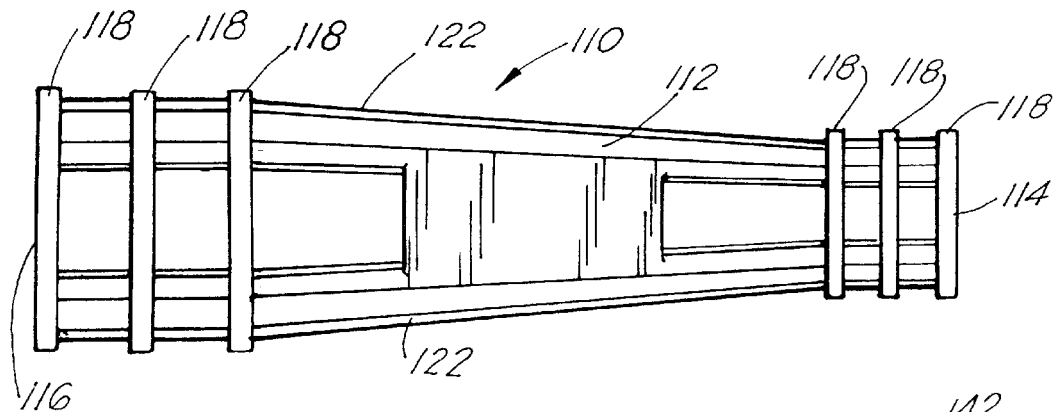
FIG. 3 is an overall view of the improved connector assembly body of the present invention.

FIGS. 1 and 2 illustrate the preferred embodiment of the apparatus of the present invention by the numeral 10. What is provided is an interference-suppressing cable boot assembly 10 comprising an elongated assembly body 12 having a first end portion 14 and a second end portion 16. In the preferred embodiment, body portion 12 would be comprised of an ethylene-propylene diene monomer rubber, which would be ozone resistant. The rubberized body 12 would include an upper body portion 20, and a lower body portion 22. Upper body portion 20 would comprise a continuous annular wall portion 24, defining an overall diameter D1, and lower body portion 22 would include a continuous annular wall portion 25, defining a reduced diameter D2. There would be included an annular beveled surface 26, interconnecting the upper body wall 24 and the lower body wall 25 for defining the entire length of body portion 12. At the upper or first end 14 of body portion 12, there would be included a flexible ring member 28, having a reduced annular opening 29, through which a first coaxial cable 30 would be inserted therethrough. Likewise, the lower end 16 of the lower body portion 22 would include a circular end portion 34, having also a reduced diameter opening 36, through which a second coaxial cable 39 would be inserted. Between the two end portions 14,1 6, there would be defined an internal space 38 wherein the connection between cable 30 and cable 39 would be housed within the apparatus 10, identified as connection assembly 45 in FIG. 2.

As seen further in FIG. 2 of the drawings, the continuous annular wall portions 24 and 25 would include an inner surface 40, which would define the interior wall of internal space 38 of the body portion 20. There would be provided a lining means 39 on the inner surface 40 of the body portion 20, extending from the first upper end 14 to the second lower end 16. This lining means would comprise a thin metal shield 42 comprised preferably of an aluminum tape material, such as aluminum polypropylene aluminum-bonded tape 43, which would define the continuous shield 42 housed along the interior surface of internal space 38 within body member 20. Additionally, this shield 42 would be provided along both the inner surface of upper ring member 28, and the inner surface of lower ring member 34. Therefore, the entire connection assembly 45 between cables 30 and 39 are housed within the internal space 38 of body portion 20, surrounded by the shield 42, which comprises aluminum polypropylene aluminum-bonded tape 43. This would insure that any interference from EMI radiation or the like, would be shielded by the aluminum polypropylene aluminum-bonded material 43, and would resist both ingress and egress of such signals while the apparatus was in use. For purposes of further functioning, the upper reduced opening 29 would be a flexible opening which would accommodate the diameter of the cable 30 inserted therethrough, but would provide a water-tight seal between the interior edge 31 of opening 29 and the outer wall 33 of cable member 30. Likewise, the lower end 34 would provide such a water-tight seal through opening 36 and the wall 33 of cable 39 inserted therethrough.

FIGS. 3 through 5B illustrate an improved version of the interference suppressing boot assembly, which is illustrated by the numeral 110. As illustrated, assembly 110 includes an assembly body 112 having a first end 114 and a second enlarged end portion 116. FIG. 3 illustrates several of the external improvements which have been incorporated into the assembly body 112. There is first provided a plurality of external concentric rings 118, preferably three in number, which are spaced apart at the first end 114 of assembly body 112, and a second plurality of concentric rings 118, preferably three in number, which are formed at the second end 116 of the assembly body 112. As illustrated in FIG. 3, each of the plurality of concentric rings 118 at the first end 114 and rings 118 at the second end 116, define a means for gripping that particular end of the assembly body 112; for example, between one's forefinger and thumb, which facilitates in the sliding of the assembly body 112 over the cable 119 and the connector 120 as seen in FIG. 5A. Further, as seen in FIG. 3, the assembly body 112 further includes a plurality of spaced apart external longitudinal ribs 122, which are spaced apart throughout the circumference of the assembly body 112, and are utilized to strengthen the assembly body 112 although maintaining the flexibility in the assembly body 112 along its longitudinal axis. In the preferred embodiment, the concentric rings 118, and the longitudinal strengthening ribs 122, would be formed when the assembly body 112 would be molded as the single unit.

Figure 5B:
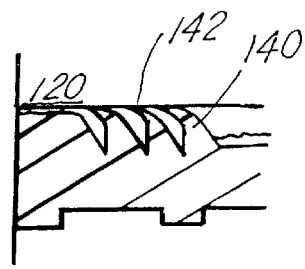
FIG. 5B is an isolated view of the internal sealing rings sealed against the wall of the connector as illustrated in FIG. 5A.
Figure 4:
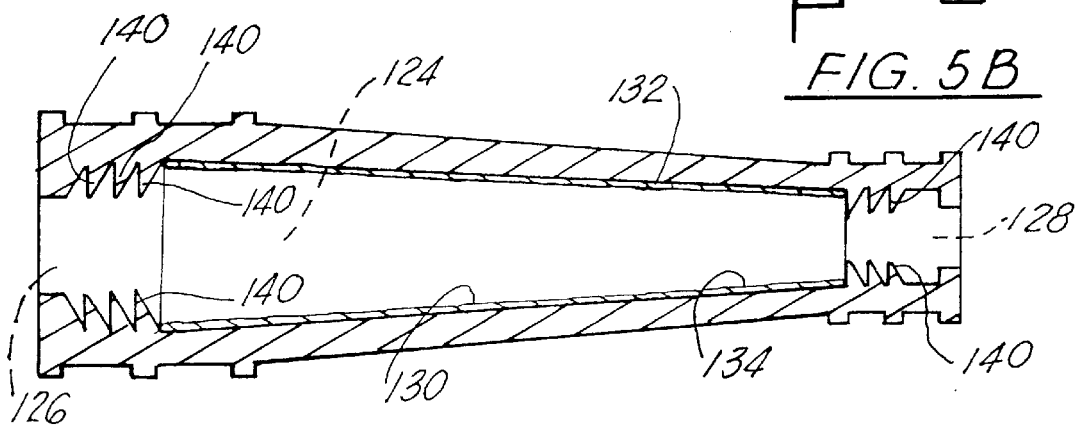
FIG. 4 is an overall cross-sectional view of the improved connector assembly body of the resent invention.
Figure 5A:
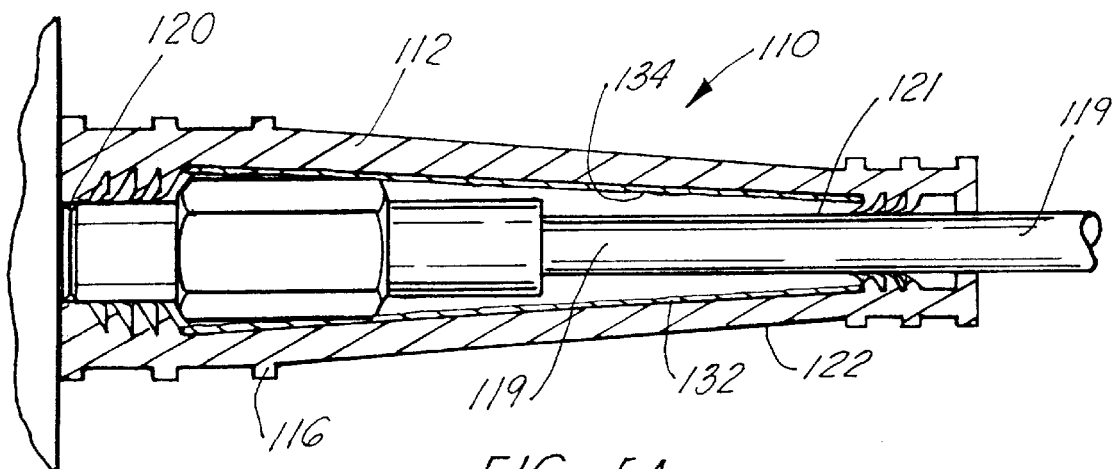
FIG. 5A is an overall cross-sectional view of the improved connector body of the present invention housing a cable and a connector therein.

Turning now to FIG. 4, the assembly body 112 is seen in cross section, where there is illustrated the internal space 124, within the assembly body 112, into which the cable 119 and the connector 120 are positioned as seen in FIG. 5A The internal space 124, includes a first end opening 126 on the first end 114 of the body 112, and a second end opening 128, on the second end 116 of the body 112, for helping to define the continuous internal space 124 therethrough. As further illustrated in FIG. 4, as with the embodiment illustrated in FIGS. 1 and 2, the interior wall 130 of the space 124, includes a lining means 132, which would comprise as a thin metallic shield 134, comprised preferably of an aluminum tape material such as aluminum polypropylene aluminum-bonded tape, which would define the continuous shield 134 housed along the interior wall 130 of internal space 124 within body member 112.

Additional features are illustrated in FIGS. 4 and 5 which include a plurality of internal sealing lips or rings 140 around the interior wall of each of the first and second openings 126, 128 in the assembly body 112. As seen for example in FIG. 4, unlike the embodiments as seen in FIGS. 1 and 2, each of the end portions 126, 128 of the body includes the plurality of sealing lips or rings 140, which are formed again in the molded interior surface of the body 112 so that as the cable 119 or connector 120 are slid into the internal space 124 into the position as seen in FIG. 5A, the flexible ends 142 of each of the lips 140 are pressed against the wall 121 of the cable 119 or connector 120, and seal against that surface. This is seen more clearly in isolated view in FIG. 5B, where each of the lips 140, are pressed against the wall 121 of the cable or connector, and in doing so form a continuous seal between the wall of the cable or connector, so as to prevent any exterior interference from entering the interior space 124 of the connector body 112 and shielding it from that interference.

The connector body would be formed of a rubber type material, preferably thermoplastic rubber forming the exterior rubberized body, in combination with the metallic layer, which comprises preferably metal based lining shield 134 housed therein, of the type similar to the metal shield 42 as seen in FIG. 2, together would define a combination which would provide body environmental and radiation leakage protection for a cable engaged to a connector, with the plurality of sealing lips found on the interior opening of the connector body sealing again the entry of the environmental and radiation interference.

The foregoing embodiments are presented by way of example only; the scope of the present invention is to be limited only by the following claims.

| PARTS LIST | |
|---|---|
| assembly | 10 |
| assembly body | 12 |
| first end portion | 14 |
| second end portion | 16 |
| upper body portion | 20 |
| lower body portion | 22 |
| annular wall portion | 24 |
| annular wall portion | 25 |
| diameter | D1 |
| diameter | D2 |
| annular beveled surface | 26 |
| flexible ring member | 28 |
| annular opening | 29 |
| first coaxial cable | 30 |
| interior edge | 31 |
| outer wall | 33 |
| end portion | 34 |
| reduced diameter opening | 36 |
| internal space | 38 |
| second coaxial cable | 39 |
| inner surface | 40 |
| metal shield | 42 |
| aluminum polypropylene aluminum-bonded tape | 43 |
| connection assembly | 45 |
| assembly | 110 |
| assembly body | 112 |
| first end | 114 |
| second end portion | 116 |
| external concentric rings | 118 |
| cable | 119 |
| connector | 120 |
| wall | 121 |
| longitudinal ribs | 122 |
| internal space | 124 |
| first end opening | 126 |
| second end opening | 128 |
| interior wall | 130 |
| lining means | 132 |
| metallic shield | 134 |
| sealing lips or rings | 140 |
| flexible ends | 142 |

For purposes of this invention, it should be noted that the use of the invention in interconnecting first and second coaxial cable is but one use. For example, in the preferred embodiment, the use of the apparatus would in general be utilized for protecting and shielding an in-line splice. For example, the apparatus could be used on splitters, taps and ground blocks and for each splitter, tap or ground block, may require one boot assembly for each connector or cable interface. For example, a tap uses four assemblies, a splitter may utilize three assemblies, and a ground block would utilize two boot assemblies.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An assembly for preventing electromagnetic interference in cable connections, comprising:

a) a generally flexible one-piece assembly body, having first and second end portions;

b) each of said end portions having an opening therethrough for accommodating a first cable connecting to a connector;

c) flexible sealing rings formed on an interior surface of each of the openings of said end portions for engaging around the first cable and the connector, and defining a seal between the assembly body and the first cable and the connector;

d) a cavity within the assembly body for housing the connection between said first cable and said connector;

e) a metal-based lining positioned along an interior surface a body wall within the cavity for preventing ingress and egress of radiation from the connection between said first cable and said connector.

2. The assembly in claim 1, wherein the assembly body comprises a generally flexible thermoplastic rubber.

3. The assembly in claim 1, wherein the flexible sealing rings comprise three concentric, flexible lips on the interior surface of the assembly body at each of said end portions for defining a water-tight compressible fit between at least the assembly body and the connector and the first cable.

4. The assembly in claim 2, wherein the flexible thermoplastic rubber is ozone-resistant.

5. The assembly in claim 1, wherein the first cable may be from a group selected from coaxial, triaxial or fiber optic cables.

6. A removable assembly for preventing electromagnetic interference in cable connection, comprising:

a) a generally flexible rubber-based assembly body, having first and second end portions, each of said end portions having an opening therethrough for accommodating a first cable connected to a connector therethrough;

b) reinforcing ribs extending along the length of the assembly body for strengthening the body but allowing flexibility of the body;

c) a plurality of flexible lip members extending along the interior surface of the assembly body adjacent each first and second end portions, for forming a water-tight seal between the assembly body and the first cable and connector junction;

d) a cavity within the assembly body for housing the connection between said first cable connected to said connector;

e) a metal based lining top to bottom positioned along an interior surface of a body wall within the cavity for preventing electromagnetic leakage in and out of the connection between said first cable and said connector.

7. The assembly in claim 6, wherein the assembly body further comprises a plurality of raised, concentric rings along the exterior surface at each of the first and second end portion for facilitating gripping of the assembly body when installing the first cable and the connector therein.

8. The assembly in claim 6, wherein the opening at each of said end portions forms a compressible connection between the first cable connected to the connector and the assembly body which is resistant to water or other environmental hazards.

9. The assembly in claim 6, wherein the rubber-based assembly body further comprises ozone-resistant thermoplastic rubber.

10. The assembly in claim 6, wherein the first cable may be from a group selected from coaxial, triaxial, copper twisted pair or fiber optic cables.

11. An assembly for preventing electromagnetic interference in a cable connection, comprising:

a) a generally flexible one-piece assembly body having first and second end portions, and a bore therethrough, said body slidably engagable over the cable connection;

b) at least one of said end portions defining a plurality of flexible rings on its interior surface for forming a compressible seal between the assembly body and the cable connection when the assembly is slidably engaged around the cable connection;

c) a cavity within the assembly body for housing the cable connection sealed within the assembly body; and d) a metal-based lining positioned along an interior surface of a wall of the assembly body within the cavity for preventing ingress and egress of radiation to the cable connection sealed within the assembly body.

12. The assembly in claim 11, wherein the assembly further comprises the second end portion comprising said plurality of flexible rings along its interior surface for forming a compressible seal against said cable connection.

13. The assembly in claim 11, further comprising a plurality of exterior concentric rings for facilitating gripping the assembly during installation, and a plurality of longitudinal external ribs for strengthening the assembly while in use.

* * * * *